US005200243A

United States Patent [19]

Van Veen

[11] Patent Number: 5,200,243

[45] Date of Patent: Apr. 6, 1993

[54] LABEL

[75] Inventor: Hendrik J. Van Veen, AT Amsterdam, Netherlands

[73] Assignee: Avery Dennison Corporation, Pasadena, Calif.

[21] Appl. No.: 857,381

[22] Filed: Mar. 25, 1992

[30] Foreign Application Priority Data

Mar. 28, 1991 [NL] Netherlands ........................ 9100560

[51] Int. Cl.[5] ........................ B42D 15/00; B32B 3/00

[52] U.S. Cl. ........................................ 428/40; 428/68; 428/77; 428/156; 428/157; 428/343; 428/352; 428/354

[58] Field of Search ..................... 428/40, 68, 77, 156, 428/157, 343, 352, 354

[56] References Cited

U.S. PATENT DOCUMENTS 3,709,763 1/1973 O'Neil ................................ 428/343
3,870,593 3/1975 Elton et al. .......................... 428/343
4,323,608 4/1982 Denney et al. ....................... 428/43
4,621,837 11/1986 Mack .................................. 283/105
4,652,473 3/1987 Han ...................................... 428/40

FOREIGN PATENT DOCUMENTS 0043179 1/1982 European Pat. Off. .
0087987 9/1983 European Pat. Off. .
0304242 2/1989 European Pat. Off. .
86/04551 8/1986 World Int. Prop. O. .

*Primary Examiner*—William J. Van Balen
*Attorney, Agent, or Firm*—Poms, Smith, Lande & Rose

[57] ABSTRACT

A label for a holder with an outer surface, a curved outer surface in particular, wherein the label extends between a front edge and a rear edge spaced from one another along a main axis of the label, the label comprising at least one information panel with a front edge and a rear edge spaced from one another along the main axis; a base sheet for supporting the information panel, wherein at least a part of the bottom surface of the base sheet is provided with an adhesive for adhesion to a relatively flexible label bearing sheet and the outer surface of the container, respectively, and has a front edge and a rear edge spaced from one another along the main axis; and a protective sheet for covering the information panel, wherein a first section of the lower surface of said protective sheet is adhered to the top surface of the base sheet and a second section of it extends beyond the rear edges of the information panel, the base sheet extending to the rear edge of the label, wherein at least a portion of the lower surface of the second section is provided with an adhesive which enables it to be adhered to and released from the outer surface of the container on repeated occasions.

20 Claims, 1 Drawing Sheet

LABEL

BACKGROUND OF THE INVENTION

The a label for a container with an outer surface, wherein the label comprises a base sheet with a superposed protective sheet and at least one information sheet positioned between the base sheet and the protective sheet. Before being applied to the outer surface of the container, the base sheet is adhered to a label bearing sheet, usually a longitudinal strip, adjacent to base sheets of other similar labels.

Such a label is known, for example, from European patent application 43179, which shows and describes a label, the protective sheet of which is adhered to the base sheet at two opposite edges, at one of them after having been turned back, and is provided with tear lines arranged just within those edges. At the location of the edge turned back, the protective sheet passes into a kind of foldable sheet comprising a strip of printing paper folded like a concertina or spirally in order to obtain a plurality of information panels. The foldable sheet is positioned between the protective sheet and the base sheet and may be unfolded after being torn along the tear lines for acquiring information. The protective sheet cannot be put back. In fact, in view of the possibility of damage or, for example, due to rain, the foldable sheet can only be consulted once. Furthermore, it is noted that the structure of that known label makes it rather stiff and insufficiently compliant to be brought into or out of a curved condition without the formation of wrinkles in one or more of the sheets or panels, as may occur, for example, during the passage of a strip of silicone paper provided with labels along several labelling machine rollers, or during the application of said label to an outwardly curved surface of a container.

Another label is known from European Patent Application 87987, in which a label is shown and described which consists of a base sheet which, together with the base sheets of other labels, is releasably adhered to a rollable supporting strip. Also, the protective sheet of this label passes, at one of its edges, in this case the front edge, into a strip of printing material folded spirally into a foldable sheet positioned between the base sheet and the protective sheet. At its other edge the protective sheet is extended with a projection, the lower surface of which is provided with a band of releasable adhesive enabling releasable adhesion on the upper surface of the base sheet or at surfaces of the protective sheet itself. When said label is passed in series on a bearing strip along rollers and is applied to curved surfaces, the stiffness due to its structure may cause the formation of wrinkles, making the label less attractive, or disturbances may occur during the labelling by using automatic labelling equipment.

SUMMARY OF THE INVENTION

A main purpose of the invention is to provide a label of the type mentioned in the preamble, which is especially suitable for application to curved surfaces of containers. To this purpose, the invention provides a label for a container with an outer surface, wherein the label extends between a front edge and a rear edge spaced from one another along a main axis of the label, wherein the label comprises at least one information panel with a front edge and a rear edge spaced from one another along the main axis; a base sheet for supporting the information panel, wherein at least a part of the bottom surface is provided with an adhesive for adhesion to a relatively flexible label bearing sheet and the outer surface of the container, respectively, and has a front edge and a rear edge spaced from one another along the main axis; and a protective sheet for covering the information panel, wherein a first section of the lower surface of the protective sheet is adhered to the upper surface of the base sheet and a second section of it extends beyond the rear edges of the information panel, the base sheet extending to the rear edge of the label, wherein at least a portion of the lower surface of the second section is provided with an adhesive which enables it to be adhered to and released from the outer surface of the container on repeated occasions.

Another purpose of the invention in this connection is to provide a type of label which is suitable for being passed along rollers of a labelling machine, with a minimized chance of the formation of wrinkles, when applied in series to a bearing strip. To this end the invention provides a label assembly consisting of a plurality of labels according to one of the preceding claims adhered to the upper surface of a label bearing sheet, wherein the adhesive on the lower surface of the second section of the protective sheet of the labels enables the adhesion to and the release from the label bearing sheet on repeated occasions, wherein the adhesive has an adhesion strength that allows loosening upon passage of the lower surface of the label bearing sheet along a roller surface, with the front edges of the labels in the lead.

Preferred embodiments are described in claims 2-10, the contents of which is referred to and hence regarded as being included in this description.

Additional objectives and details of the invention will be clear to those skilled in the art after having studied the present application.

The invention will now be elucidated by way of the following description of the preferred embodiments of the label as well as the label assembly according to the invention, as illustrated in the enclosed figures.

DESCRIPTION OF THE PREFERRED EMBODIMENT

Figure 1:
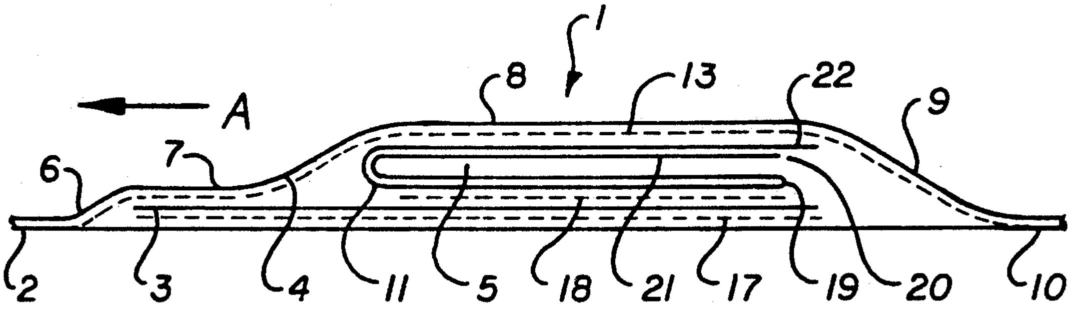
FIG. 1 shows a longitudinal section of a preferred embodiment of the label according to the invention, being applied to a label bearing sheet.

Label 1 in FIG. 1 is substantially rectangular and has a main axis that extends horizontally, as seen in the plane of the drawing. Label 1 comprises a base sheet 3 of uncoated cellulose-free paper, the entire lower surface of which is provided with an adhesive 17 being especially suitable for adhesion to plastic container walls and may be an acrylic adhesive, such as Fasson S660 available with Fasson Nederland B. V., Leyden, The Netherlands. Furthermore, it can, of course, be releasably adhered to the upper surface of the continuous label bearing strip 2, which is made from silicone paper, for instance. The upper side of label 1 is formed by a protective sheet 4 of, for example, clear transparent vinyl laminate. Said protective sheet 4 extends between the front edge, as seen in the direction A of the intended transport of web 2, and the rear edge of label 1 with the sections 6, 7, 8, and 9, respectively, and its entire lower surface is provided with an adhesive 13, which enables adhesion to—as passing from the front edge to the rear edge—the upper surface of web 2 (at section 6), the upper surface of base sheet 3 (at section 7), the top surface of the upper sheet 20 of booklet 5 (at section 8) whose description will follow, and again the top surface of web 2 (at section 9). As to this example, this adhesive is an acrylic adhesive, known as Jackstaedt E110, and is available with Jackstaedt GmbH, Wuppertal, Germany.

Section 9 of protective sheet 4 extends rearwards beyond base sheet 3. Between the rear portions of base sheet 3 and protective sheet 4, a kind of booklet 5 is positioned, consisting of a number of double-folded sheets of cellulose-free machine-coated satin paper that form a back 11 extending transversely to the main axis. The entire lower surface of the lower sheet 19 of the booklet 5 is adhered to the upper surface of base sheet 3 by means of a screen printing adhesive. The entire upper surface of the upper sheet 20 of the booklet 5 is adhered to the lower surface of the protective sheet 4 by means of adhesive J55, as mentioned before. Sheets 19, for instance, have been adhered in the back by means of a paper glue. As can be seen, section 22 of the upper sheet 20 extends beyond the lower sheets 19, 21 of the booklet. In this way, the adhesive bottom surface of protective sheet 9 is prevented from adhering to the lower sheets 19, 21. Furthermore, it is noticed that the back 11 of booklet 5 is protected by a protective sheet 4, wherein a smooth transition from the thin part of label 1 (left side of FIG. 1) to the (relatively) thick part of label 1 (right side of FIG. 1) has been realized. This smooth transition enables a label having considerable differences in thickness to be applied by means of a labelling machine in a tension-free manner. The labels known so far, being discontinuous at the leading edge of the back, might catch their back behind the boundaries of narrow passages in labelling machines, wherein also the base sheet will be torn off the bearing belt and stick to parts of the machine, resulting in disturbances of the machine.

At the rear edge of the label 1, the lower surface of section 9 of the protective sheet is provided with a band of adhesion-suppressing means 10 positioned transversely to the main axis, such as screen printing ink in a noticeable color.

Figure 2:
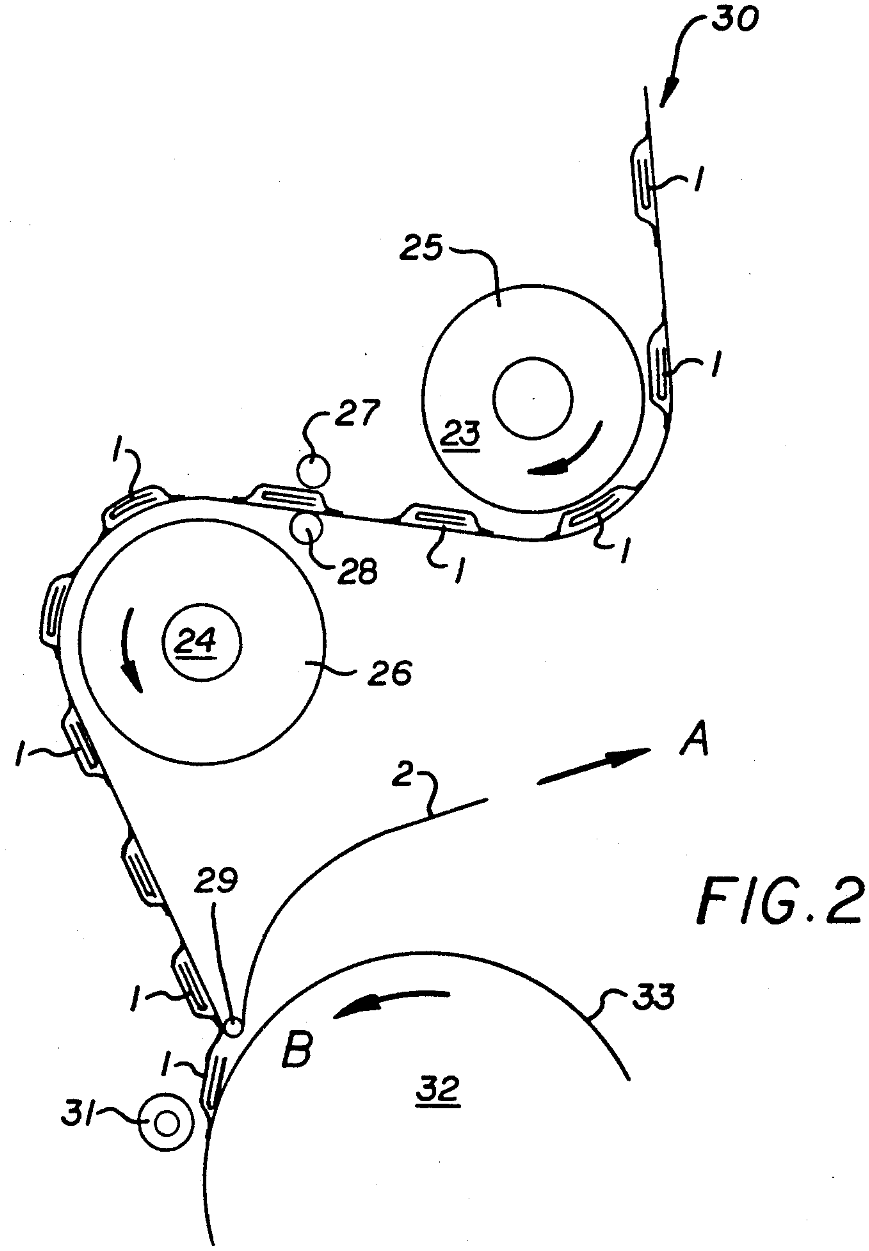
FIG. 2 shows a part of a labelling machine, wherein a label assembly according to the preferred embodiment is passed along a plurality of rollers until they are applied to containers.

FIG. 2 shows label assembly 30 comprising a label bearing web 2 and a series of labels 1 releasably adhered onto it. Following the direction of arrow A, label assembly 30 is transported along a first roller 23 with surface 25, between two driving rollers 27, 28, subsequently around a second roller 24 with surface 26, to separation roller 29, where the labels are separated from belt 2 which is discharged afterwards. For the sake of clarity in the drawing, the web 2 is represented as being spaced from the surfaces of the rollers 25 and 26.

In the shown path up to roller 23, sections 9 of the labels 1 are not adhered to belt 2, or only slightly. During the passage of the assembly 30 along surface 25 of roller 23, first the thin section of the label is clamped between web 2 and the roller surface 25. This presents no problem thanks to the smooth transition of belt 2, via front section 6 of the protective sheet. As a result of the smooth transition to the section of the label where booklet 5 is positioned, caused by the screening effect of the protective sheet, also the passage of the back 11 of the booklet along the roller surface 25 will cause no difficulties. Due to the differences in distance of the respective sheets of the booklet to the center of rotation of roller 23, however small they may be, the sheets will tend to shift over one another. This is permitted due to the fact that sufficient freedom of backward movement is provided for the sheets. This freedom of movement is even increased, as trailing section 9 of the protective sheet is not adhered to web 2, or is at least so lightly adhered to web 2 (by a suitable selection of the adhesive) that backward forces resulting from a possible accumulation of sheet material Will cause section 9 of the protective sheet to slide slightly backwards along web 2.

After having been passed along roller 23, section 9 of the prctective sheet will be adhered to web 2. After passage between the driving rollers 27 and 28, the web 2 reaches roller 24, where it is diverted in the opposite direction. During the passage of the labels 1 along roller surface 26, probably because the booklet 5 and protective sheet 4 are less flexible than web 2, section 9 of the protective sheet is torn off the web again, and this situation remains until label 1 arrives at separation roller 29. There, the web 2 is diverted at a sharp included angle so as to effect the release of the front edge of label 1 from web 2 so that it can engage the curved surface 33 of container 32. At the same time, container 32 rotates in the direction of arrow B, resulting in a smooth adherence of base sheet 3 of label 1 to the outer surface 33. Because the sheets of booklet can shift freely with respect to one another again, the differences in distance to the rotation axis present no problems either. In fact, the sheets are gently placed against surface 33, while excessive shear stresses amongst the sheets and between the sheets and the other parts of the label are largely prevented, so that labels can be applied to round containers 32 without causing wrinkles. The press roller 31 ensures that the base sheet is firmly adhered to the outer surface of the container 32.

The label thus applied to a container according to the invention may easily be opened by any user by engaging the band 10 and turning the sections 8 and 9 of the protective sheet. Consequently, page 20 is turned too, after which the user can read page 19. Within the scope of the invention, of course, also embodiments might be constructed in which sheet 20 would not be (entirely) adhered to section 8 of the the protective sheet. Obviously, the same goes for the adhesion of page 19 to the base sheet 3. The booklet 5 may entirely or partly be releasable from the covering formed by the protective sheet 4 and the base sheet 3. Furthermore, the booklet may consist only of sheets 19 and 20, which are adhered to the base sheet and the protective sheet, respectively.

I claim:

1. A label for a container having an outer surface, wherein the label extends between a front edge and a rear edge, spaced from one another along a main axis of the label, wherein the label comprises:

at least one information panel with a front edge and a rear edge spaced from one another along the main axis;

a base sheet for supporting the information panel, wherein at least a part of the bottom surface of the base sheet is provided with an adhesive for adhesion to a relatively flexible label bearing sheet and the outer surface of the container, respectively, and has a front edge and a rear edge spaced from one another along the main axis; and a protective sheet for covering the information panel, wherein a first section of the lower surface of said protective sheet is adhered in the upper surface of the base sheet and a second section of it extends beyond the rear edges of the information panel, the base sheet extending to the rear edge of the label, wherein at least a portion of the lower surface of the second section is provided with an adhesive, which enables it to be adhered to and released from the outer surface of the container on repeated occasions.

2. A label according to claim 1, wherein a portion of the lower surface of the second section of the protective sheet is provided with an adhesion suppressing means to enable any user to grip it.

3. A label according to claim, comprising a plurality of superposed information panels, wherein the rear edge of the upper information panel is positioned nearer to the rear edge of the label than the rear edge of any of the other information panels.

4. A label according to claim 3, wherein the rear edge of the upper information panel is positioned nearer, than the rear edge of the base sheet, to the rear edge of the label.

5. A label according to claim 4, wherein the front edges of at least a number of the information panels are equally spaced from the rear edge of the label and are interconnected at positions located on a line transverse to the main axis.

6. A label according to claim 5, wherein said number of information panels form a booklet, the back of which coincides with the front edges of the information panels.

7. A label according to claim 6, wherein a third section of the protective sheet is adhered to the top surface of the upper information panel.

8. A label according to claim 7, wherein the bottom information panel is adhered to the top surface of the base sheet.

9. A label according to claim 8, wherein the front edge of the protective sheet forms the front edge of the label, and wherein a fourth section of the protective sheet is positioned between the front edge of the protective sheet and the front edge of the base sheet, and at least a part of a lower surface of the fourth section is provided with an adhesive for adhesion to the label bearing sheet and the outer surface of the container.

10. A label according to claim 9, wherein the first section of the protective sheet extends between the front edge of the base sheet and the front edge of the information panel.

11. A label assembly consisting of a number of labels according to claim 1, adhered to the upper surface of a strip-like label bearing sheet, wherein the adhesive on the lower surface of the second section of the protective sheet of the labels enables the adhesion to and the release from the label bearing sheet on repeated occasions, wherein the adhesive has an adhesion strength that allows loosening upon passage of the lower surface of the label bearing sheet along a roller surface, with the front edges of the labels in the lead.

12. A label assembly according to claim 11, wherein a portion of the lower surface of the second section of the protective sheet is provided with an adhesion suppressing means to enable any user to grip it.

13. A label assembly according to claim 12, wherein said label has a plurality of superposed information panels, the rear edge of the upper information panel being positioned nearer to the rear edge of the label than the rear edges of any of the other information panels.

14. The label assembly according to claim 13, wherein the rear edge of the upper information panel is positioned nearer, than the rear edge of the base sheet, to the rear edge of the label.

15. The label assembly according to claim 14, wherein the front edges of at least a number of information panels are equally spaced from the rear edge of the label and are interconnected at positions located on a line transverse to the main axis.

16. The label assembly according to claim 15, wherein said number of information panels form a booklet, the back of which coincides with the front edges of the information panels.

17. The label assembly according to claim 16, wherein a third section of the protective sheet is adhered to the top surface of the upper information panel.

18. The label assembly according to claim 17, wherein the bottom information panel is adhered to the top surface of the base sheet.

19. The label assembly according to claim 18, wherein the front edge of the protective sheet forms the front edge of the label, and wherein a fourth section of the protective sheet is positioned between the front edge of the protective sheet and the front edge of the base sheet, and at least a part of a lower surface of the fourth section is provided with an adhesive for adhesion to the label bearing sheet and the outer surface of the container.

20. The label assembly according to claim 19, wherein the first section of the protective sheet extends between the first edge of the base sheet and the front edge of the information panel.

* * * * *